United States Patent
Owens et al.

(10) Patent No.: US 10,945,451 B2
(45) Date of Patent: Mar. 16, 2021

(54) YEAST CONTAINING SILAGE INOCULANTS FOR THE ENHANCEMENT OF SILAGE DIGESTION AND FERMENTATION IN THE RUMEN

(71) Applicant: PIONEER HI-BRED INTERNATIONAL, INC., Johnston, IA (US)

(72) Inventors: Fredric Owens, West Des Moines, IA (US); Brenda Smiley, Granger, IA (US)

(73) Assignee: PIONEER HI-BRED INTERNATIONAL, INC.

( * ) Notice: Subject to any disclaimer, the term of this patent is extended or adjusted under 35 U.S.C. 154(b) by 0 days.

(21) Appl. No.: 15/713,396

(22) Filed: Sep. 22, 2017

(65) Prior Publication Data

US 2018/0007933 A1    Jan. 11, 2018

Related U.S. Application Data

(62) Division of application No. 13/915,254, filed on Jun. 11, 2013.

(60) Provisional application No. 61/658,757, filed on Jun. 12, 2012.

(51) Int. Cl.
| | |
|---|---|
| A23K 10/00 | (2016.01) |
| A23K 30/18 | (2016.01) |
| A23K 10/16 | (2016.01) |
| A23K 10/18 | (2016.01) |
| A23K 50/10 | (2016.01) |
| A23K 30/00 | (2016.01) |

(52) U.S. Cl.
CPC .............. *A23K 30/18* (2016.05); *A23K 10/16* (2016.05); *A23K 10/18* (2016.05); *A23K 30/00* (2016.05); *A23K 50/10* (2016.05)

(58) Field of Classification Search
CPC ......... A23K 30/18; A23K 30/00; A23K 10/16
See application file for complete search history.

(56) References Cited

U.S. PATENT DOCUMENTS

| | | | |
|---|---|---|---|
| 3,547,654 A | 12/1970 | Olsen | |
| 6,337,068 B1 | 1/2002 | Hendrick | |
| 6,403,084 B1 | 11/2002 | Chan et al. | |
| 2004/0052902 A1* | 3/2004 | Shimakawa | C12Q 1/025 426/34 |
| 2006/0046292 A1 | 3/2006 | Nsereko | |
| 2007/0269416 A1 | 11/2007 | Watson | |
| 2008/0138461 A1 | 6/2008 | Chan et al. | |
| 2009/0028992 A1 | 1/2009 | Chan et al. | |
| 2009/0202678 A1 | 8/2009 | Sampsonis et al. | |
| 2013/0309356 A1* | 11/2013 | Radtke | C12F 3/10 426/53 |

FOREIGN PATENT DOCUMENTS

| | | |
|---|---|---|
| WO | WO2001004291 A1 | 1/2001 |
| WO | WO2009097333 | 8/2009 |
| WO | WO2011050478 | 5/2011 |
| WO | WO2014007946 | 1/2014 |

OTHER PUBLICATIONS

Holzer et al. abstract "The role of Lactobacillus buchneri in forage preservation" Trends in Biotechnology vol. 21. No. 6 Jun. 2003 pp. 282-287 (Year: 2003).*
Edwards-Ingram, et al., "Genotypic and Physiological Characterization of *Saccharomyces boulardii*, The Probiotic Strain of *Saccharomyces cerevisiae*", Applied and Environmental Microbiology, Apr. 2007, p. 2458-2467.
Jespersen, Lene, "Occurrence and taxonomic characteristics of strains of *Saccharomyces cerevisiae* predominant in African indigenous fermented foods and beverages", FEMS Yeast Research 3 (2003) 191-200.
Nikolaou, et al., "Selection of indigenous *Saccharomyces cerevisiae* strains according to their oenological characteristics and vinification results", Food Microbiology 23 (2006) 205-211.
Van der Aa Kuhle, et al., "In vitro screening of probiotic properties of *Saccharomyces cerevisiae* var. *boulardii* and food-borne *Saccharomyces cerevisiae* strains", International Journal of Food Microbiology 101 (2005) 29-39.
Van Dijken, et al., "An interlaboratory comparison of physiological and genetic properties of four *Saccharomyces cerevisiae* strains", Enzyme and Microbial Technology 26 (2000) 706-714.
International Preliminary Report on Patentability for International Application No. PCT/US2013/045081, dated Dec. 16, 2014.
Basso, et al.; "Fermentation and aerobic stability of corn silage inoculated with Lactobacillus buchneri," Revista Basileria de Zootecnia; (2012) 41(7): 1789-1794.
Callaway, E. S. and Martin, S. A. (1997). Effects of a *Saccharomyces cerevisiae* culture on ruminal bacteria that utilize lactate and digest cellulose. J. Dairy Sci. 80, 2035-2044.
Desnoyers, M., Giger-Reverdin, S., Bertin, G., Duvaux-Ponter, C. and Sauvant, D. (2009). Meta-analysis of the influence of *Saccharomyces cerevisiae* supplementation on ruminal parameters and milk production of ruminants. J. Dairy Sci. 92, 1620-1632.
Driehuis, et al.; "Fermentation characteristics and aerobic stability of grass silage inoculated with Lactobacillus buchneri, with or without homofermentative lactic acid bacteria." Grass and Forage Science; (2001) 56:330-343.
Erasmus, L. J., Botha, P. M. and Kistner, A. (1992). Effect of yeast culture supplementation on production, rumen fermentation and duodenal microbial flow in dairy cows. J. Dairy Sci. 75, 3056-3065.
Filya,I.;"The effect of Lactobacillus buchneri, with or without homofermentative lactic acid bacteria, on the fermentation, aerobic stability and ruminal degradability of wheat, sorghum and maize silages," Journal of Applied Microbiology; (2003) 95:1080-1086.
Guedes, C. M.; Goncalves, M. A. M.; Rodrigues, A.; Dias-da-Silva. A. (2008). Effects of a *Saccharomyces cerevisiae* yeast on ruminal fermentation fibre degradation of maize silages in cows. Animal Feed Sci, and Tech. 145, 27-40.

(Continued)

*Primary Examiner* — Felicia C Turner

(57) ABSTRACT

The invention relates to compositions for use as silage inoculants comprising a yeast strain, one or more bacterial stains, and a suitable carrier. The invention also relates to methods of improving livestock animal silage and meat and milk performance of a livestock animal.

6 Claims, No Drawings

(56) References Cited

OTHER PUBLICATIONS

Holzer, et al.; "The role of Lactobacillus buchneri in forage preservation," Trends in Biotechnology; (2003) 21(6):282-287.
International Search Report PCT/US2013/045081 dated Dec. 17, 2013.
Kang et al. (CN101028038 Derwent Translation 2 pages) discloses *S. cerevisiae* and *L. casei* powder coupled with corn flour and wheat bran flour to make a feed additive [abstract].
Kleinschmit, et al.; "The Effects of Various Antifungal Additives on the Fermentation and Aerobic Stability of Corn Silage," Journal of Dairy Science; (2005) 88(6):2130-2139.
Newbold, C. J., McIntosh, F. M., and Wallace, R. J. (1996). Mode of action of yeast *Saccharomyces cerevisiae* as a feed additive for ruminants. Brit. J. Nutr. 76 249-261.
Offer, N. W. (1990). Maximizing fiber digestion in the rumen: the role of yeast culture. In Biotechnology in the Feed Industry, ed. T. P. Lyons, Alltech Technical Publications, Nicholasville, Kentucky, pp. 79-96.
Park KR 100268680 Machine translation 12 pages discloses *S. cerevisiae* and *L.* sp. fermented with pre-ensiled plant material to make fodder [abstract].
Shi, et al.; "Effects of different bacterial inoculants on the fermentation and aerobic stability of whole-plant corn silage," African Journal of Agricultural Research; (2012) 7(2):164-169.
Database WPI Week 200918 Thomson Scientific, London, GB; AN 2009-F55784 XP002716550, & JP 2009 044971 A(Dokuritsu Gyosei Hojin Nogyo Seibutsu Sh) Mar. 5, 2009 (Mar. 5, 2009).
Database WPI Week 201214 Thomson Scientific, London, GB; AN 2011-Q34734 XP002716551, & CN 102 250 807 A (Univ Guangxi) Nov. 23, 2011 (Nov. 23, 2011).
T.R. Young, N.C. Burdick, J.A. Carroll, M.A. Jennings, J.T. Cribbs, R. J. Rathmann, J.R. Corley, B.J. Johnson, Yeast cell wall supplementation alters the performance and health of beef heifers during the receiving period, Texas Tech University, Department of Animal and Food Sciences, Lubbock, Texas; USDA-ARS, Livestock Issues Research Unit, Lubbock, Texas, Lesaffre Feed Additives, Milwaukee, Wisconsin, Abstract from Graduate Student Research Presentations 2012 Plains Nutrition Council Spring Conference Apr. 11-13, 2012 San Antonio, TX.
Zhou et al. (CN1559261 Derwent Abstract Jan 5, 2005 1 page).
Balch, C. C.; et al.: "Factors Affecting the Utilization of Food by Dairy Cows," British Journal of Nutrition, Jun. 20, 1950 (Jun. 20, 1950), vol. 4, No. 4, pp. 389-394.
Grazia, L.; et al.: "A survey of lactic acid bacteria in Italian silage," Journal of Applied Bacteriology, 1984, vol. 56, pp. 373-379.
Martin, Scott; et al: "Symposium: Direct-Fed Microbials and Rumen Fermentation," J Dairy Sci, Jan. 24, 1992 (Jan. 24, 1992), vol. 75, pp. 1736-1744.
Nocek, J. E.; et al.: "Effects of supplementation with yeast culture and enzymatically hydrolyzed yeast on performance of early lactation dairy cattle," J. Dairy Sci., Apr. 17, 2011 (Apr. 17, 2011), vol. 94, pp. 4046-4056.
Querol, Amparo; et al.: "A Comparative Study of Different Methods of Yeast Strain Characterization," System Appl. Microbiol., Jan. 21, 1992 (Jan. 21, 1992), vol. 15, pp. 439-446.
Robinson, P.H: "How you feed can be as important as what you feed," Advances in Dairy Technology, 1992, vol. 4, pp. 106-112.
Robinson, P. H.: "Matching energy and protein for rates of rumen digestion," Advances in Dairy Technology, 1992, vol. 4, pp. 84-94.
Sousa, M.J.; et aL: "Stress and Cell Death in Yeast Induced by Acetic Acid," Cell Metabolism—Cell Homeostasis and Stress Response, Jan. 25, 2012 (Jan. 25, 2012), pp. 73-100.
Swanson, Kelly S.; et al. "Supplemental Fructooligosaccharides and Mannanoligosaccharides Influence Immune Function, Ileal and Total Tract Nutrient Digestibilities, Microbial Populations and Concentrations of Protein Catabolites in the Large Bowel of Dogs," American Society for Nutritional Sciences, Feb. 18, 2002 (Feb. 18, 2002), pp. 380-989.
Nallace, R. J.; et aL: "Probiotics for ruminants," Probiotics: The Scientific Basis, 1992, pp. 317-353.

* cited by examiner

YEAST CONTAINING SILAGE INOCULANTS FOR THE ENHANCEMENT OF SILAGE DIGESTION AND FERMENTATION IN THE RUMEN

CROSS-REFERENCE TO RELATED APPLICATIONS

The present application is a divisional application of U.S. application Ser. No. 13/915,254 filed Jun. 11, 2013, which claims priority from U.S. Provisional Application No. 61/658,757 filed Jun. 12, 2012, which is hereby incorporated herein by reference in its entirety.

FIELD OF THE INVENTION

The invention relates to compositions and methods of preserving silage such that aerobic stability is preserved, as well as enhancing ruminal fermentation and digestion to increase animal meat and milk production.

BACKGROUND OF THE INVENTION

*Saccharomyces cerevisiae* yeast strains are routinely fed to ruminants as supplements to increase meat and milk production. Several theories are detailed in the literature regarding possible modes of action of yeast in animal performance (Robinson, 2002; Desnoyers et al., 2009). It is probable that multiple mechanisms may be involved depending upon the prevailing conditions.

However, traditionally, yeasts are considered to be detrimental in silage due to their contribution to aerobic spoilage and dry matter losses when the silage is exposed to air. Indeed, some *Lactobacillus buchneri* inoculants are used to reduce the detrimental yeast population of silage (U.S. Pat. No. 6,403,084 B1).

Yeast strains that are able to withstand silage conditions and could be delivered to the animal as the animal consumes silage instead of added to the diet would greatly increase efficiency and savings for dairy and livestock producers.

The inventors have developed novel yeast strains and methods of treating pre-ensiled plant material to deliver such a benefit.

DETAILED DESCRIPTION

The invention consists of live yeast-containing silage inoculants and novel *Saccharomyces cerevisiae* yeast strains for use in silage to enhance ruminal fermentation and digestion of silage, thereby improving animal productivity.

Viable yeast in the diet can remove products detrimental to rumen stability, scavenge glucose, reduce lactate and prevent drops in pH that reduce fiber digestion and intake (Guedes et al., 2008; Nocek et al., 2007; Callaway and Martin, 1997). Live yeast may rapidly scavenge residual oxygen in the rumen, thereby increasing the activity of obligately anaerobic cellulose digesting bacteria (Newbold et al., 1996). Yeast or yeast by-products may provide nutrients, such as amino acids, peptides, vitamins, nucleic acids, branched chain VFAs or malate, which are beneficial for growth of ruminal bacteria (Offer, 1990; Martin and Nisbet, 1992; Wallace and Newbold, 1990; Callaway and Martin, 1997), with a subsequent increase in microbial protein flow from the rumen (Offer, 1990; Erasmus et al., 1992; Martin and Nisbet, 1992). Yeast cell wall mannan oligosaccharides reportedly bind with pathogens, mycotoxins, or intestinal cells to protect the intestinal wall and enhance immune status of the animal (Swanson, et al., 2002).

Before describing the embodiments of the present invention in detail, it is to be understood that the embodiments of this invention are not limited to particular compositions or methods of improving digestibility of ensiled forage, which can, of course, vary. It is also to be understood that the terminology used herein is for the purpose of describing particular embodiments only, and is not intended to be limiting.

As used in this specification and the appended claims, the singular forms "a," "an" and "the" can include plural referents unless the content clearly indicates otherwise. Thus, for example, reference to "a component" can include a combination of two or more components; reference to "feed" can include mixtures of feed, and the like.

Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "inoculation," as used herein, refers to introduction of viable microbes to media or feed plant material.

The term "plant material," as used herein, refers to material of plant origin. Feed plant material can be plant material intended to be fed to an animal.

As used herein, "isolated" means removed from a natural source such as from uninoculated silage or other plant material.

As used herein, "purified" means that a strain is substantially separated from, and enriched relative to: molds, and/or other yeast or bacterial species or strains found in the source from which it was isolated.

As used herein, "improved performance" means the increase in the yield or production of meat, milk, eggs, offspring, or work. It can also refer to improved weight gain and feed efficiency of the animal and improved body condition.

The term "silage" as used herein is intended to include all types of fermented agricultural products such as grass silage, alfalfa silage, wheat silage, legume silage, sunflower silage, barley silage, whole plant corn silage (WPCS), sorghum silage, fermented grains and grass mixtures, etc.

As used herein, "pre-ensiled plant material" means grasses, maize, alfalfa and other legumes, wheat, sorghum, sunflower, barley, grains, and mixtures thereof, all of which can be treated successfully with the inoculants of the embodiments of the present invention. The inoculants of the embodiments of the present invention are also useful in treating high moisture corn (HMC).

In an embodiment of the invention the composition contains from about $10^1$ to about $10^{10}$ viable organisms of the yeast strain per gram of a pre-ensiled plant material. In a further embodiment of the invention the composition contains from about $10^2$ to about $10^7$ viable organisms of the yeast strain per gram of a pre-ensiled plant material. In yet a further embodiment the composition contains from about $10^3$ to about $10^6$ viable organisms of the yeast strain per gram of a pre-ensiled plant material.

Suitable carriers are either liquid or solid and are well known by those skilled in the art. As non-limiting examples, solid carriers can be made up of calcium carbonate, starch, cellulose and combinations thereof.

An embodiment of the invention is a biologically pure culture of *Saccharomyces cerevisae*, strain YE206, having Patent Deposit No. NRRL Y-50734. A further embodiment of the invention is a biologically pure culture of *Saccharomyces cerevisae* strain YE1241, having Patent Deposit No. NRRL Y-50735. Another embodiment of the invention is a biologically pure culture of *Saccharomyces cerevisae*, strain YE1496 having Patent Deposit No. NRRL Y-50736.

The *Saccharomyces cerevisiae* strains were deposited on Mar. 14, 2012 with the Agricultural Research Service (ARS) Culture Collection, housed in the Microbial Genomics and Bioprocessing Research Unit of the National Center for Agricultural Utilization Research (NCAUR), under the Budapest Treaty provisions. The address of NCAUR is 1815 N. University Street, Peoria, Ill., 61604. The strain YE206 was given Patent Deposit No. NRRL Y-50734. The strain YE1241 was given Patent Deposit No. NRRL Y-50735. The strain YE1496 was given Patent Deposit No. NRRL Y-50736.

The deposits will irrevocably and without restriction or condition be available to the public upon issuance of a patent. However, it should be understood that the availability of a deposit does not constitute a license to practice the subject invention in derogation of patent rights granted by government action.

A method for treating pre-ensiled plant material to enhance the aerobic stability and digestibility of the resulting silage by adding to the pre-ensiled plant material a digestibility enhancing amount of a composition containing a yeast strain of the invention, a silage preserving bacterial strain, and a suitable carrier is also disclosed.

Suitable pre-ensiled plant materials include, but are not limited to: grasses, maize, alfalfa and other legumes, wheat, sorghum, sunflower, barley, grains and mixtures thereof.

Suitable silage preserving bacterial strains include, but are not limited to: one or more of: *Lactobacillus plantarum, L. buchneri, L. alimentarius, L. crispatus, L. paralimentarius, L. brevis, Enterococcus facium,* etc. In one embodiment, the bacterial strains comprise one or more of: LP286, LP287, LP329, LP346, LP 347, LP 318, LP 319, LN4017, LN4637, LN1391, LN4750, LN1284, LN1286, LN1297, LN1326, LN5665, LP7109 or LN5689. See: U.S. Pat. Nos. 5,747,020; 6,403,084; 7,799,551; U.S. Pat. Pub. No. 2009/0028991; U.S. Pat. Pub. No. 2009/0028992; U.S. Pat. Pub. No. 2008/0138461; U.S. Pat. Pub. No. 2009/0028993; U.S. Pat. Pub. No. 2008/0138462; U.S. Pat. Pub. No. 2008/1038463, DSM Deposit No: 18113, and DSM Dposit No: 18114.

The composition that is fed to the animal has been treated with an effective catalytic amount of the yeast strain as is readily determinable by those skilled in the art in animal husbandry. Animal species that are benefited by embodiments of the present invention include, but are not limited to: ruminant, equine, bovine, porcine, caprine, ovine and avian species, e.g., poultry.

Embodiments of the present invention are further defined in the following Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

The disclosure of each reference set forth herein is incorporated herein by reference in its entirety.

EXAMPLE 1

Candidate Yeast Screening

Nine *Saccharomyces cerevisiae* strains were taken from Pioneer Hi-Bred's microbial culture collection of approximately 1700 environmental yeast isolates. Strain uniqueness was confirmed by Hinf I (Roche Applied Science, Indianapolis, Ind.) digestion of mitochondrial DNA (Querol et al., 1992). Viable yeast cells were evaluated in vitro for effects on ruminal fermentation and digestion. Filtered rumen fluid was supplemented with glucose and inoculated with live yeast cells. Samples were incubated at 39 C and pH was monitored over time (2, 4, 6 hr or 4, 8, 24 hr depending upon the study). Cotton string digestion was measured as an indicator of cellulose digestion (Balch, et. al., 1950, *Brit. J Nutr.* 4:389-94).

Yeast isolates YE206, YE1241 and YE1496 were advanced for further testing due to rumen fluid pH stabilization and/or cotton string digestion. *Saccharomyces cerevisiae* YE206 was isolated in 1998 from whole plant corn silage from Polk City, Iowa. *Saccharomyces cerevisiae* YE1241 was isolated in 1998 from European forage. *Saccharomyces cerevisiae* YE1496 was isolated in 2001 from whole plant corn silage from Quebec, Canada.

EXAMPLE 2

Effects of Yeast Silage Inoculants on Yeast Counts and Aerobic Stability of Whole Plant Corn Silage and High Moisture Corn Silage Pioneer® brand corn hybrid 35F44 (36% dry matter) and Dekalb® brand corn hybrid DK61669VT3 (33% dry matter) were harvested and ensiled in 2010 and 2011, respectively. High moisture corn grain (69% or 73% dry matter) was harvested from a mixture of corn silage hybrids and ensiled in 2010 and 2011, respectively.

*Saccharomyces cerevisiae* strains YE206, YE1241 and YE1496 were freshly grown and *Lactobacillus plantarum* strain LP286 was grown, stabilized and lyophilized as in known in the art. The treatments included control (untreated), YE206+LP286, YE1241+LP286 and YE1496+ LP286. Each yeast strain was applied to forage as an aqueous solution to deliver $1\times10^5$ CFU/g forage when applied at a rate of 2.2 mL/kg. *Lactobacillus plantarum* LP286 was used in combination with yeast and applied to deliver $1\times10^4$ cfu/g when applied at a rate of 2.2 mL/kg. All treatments were applied by syringe dispersion, and thoroughly mixed into the forage by shaking in a plastic bag.

For each treatment, two experimental 4"×14" polyvinyl chloride (PVC) pipe silos were filled and packed at 70% maximum packing density (approximately 160 kg DM/m$^3$), using a hydraulic press. Experimental silos were fitted with rubber quick caps at each end, and the top cap was equipped with a Bunsen valve to allow gasses to escape. Silos were air infused for 24 hours after 28 and 42 days of ensiling to facilitate aerobic instability.

After 60 days of ensiling, silos were emptied and the silage was thoroughly mixed. Differential yeast counts were conducted on individual treatment replicates in 2010 and on treatment composites in 2011. Total yeast counts and *Saccharomyces cerevisiaie* inoculant yeast recovery were assessed on BBL™ CHROMagar™ Candida (Sparks, Md.) after 48 to 72 hours of incubation at 30 degrees Celsius. Individual strain identity was confirmed by Hinf I (Roche Applied Science, Indianapolis, Ind.) digestion of mitochondrial DNA of selected colonies (Querol et al., 1992). Aerobic stability assessments were conducted on individual treatment replicates using the procedure of Honig (Proc. of the Eurobac. Conf., P. Lingvall and S. Lindgren (ed.) (12-16 Aug. 1986) Swed. Univ. of Agric. Sci. Grass and Forage Report No. 3-1990. Pp. 76-81. Uppsala, Sweden). The time (h) for silage temperature to rise 1.7° C. above ambient was recorded (ROT). The integration of the area between the actual silage temperature curve and the line drawn by ambient temperature (Cumm-DD) was calculated during a 7 day time period. A greater ROT and a lower Cumm-DD is desirable.

Table 1 shows the effects of the inoculants on whole plant corn silage after 60 days of ensiling. Table 2 shows the effects of the inoculants on high moisture corn silage after 60 days of ensiling. Viable inoculant yeast cells were recovered at silage opening. Inoculant yeast appeared to compete with the native yeast population, since total yeast counts were not altered by yeast inoculation. There were no adverse effects on silage aerobic stability due to yeast inoculation at the time of ensiling. In high moisture corn silage, aerobic stability was increased by inoculation with yeast relative to control.

TABLE 1

Effect of yeast inoculants on whole plant corn silage.

|  | Control | YE206 + LP286 | YE1241 + LP286 | YE1496 + LP286 |
|---|---|---|---|---|
| Total Yeast, $_{log\ CFU/g}$ | 6.35 | 5.10 | 5.66 | 4.65* |
| Inoc. Yeast, $_{log\ CFU/g}$ | 0.00 | 4.56# | 3.30* | 2.09 |
| ROT, $_{hrs}$ | 51.00 | 43.50 | 37.50 | 37.50 |
| Cumm-DD, $_{degree-hr}$ | 101.46 | 163.35 | 171.97 | 108.10 |

Values expressed as least squares means.
*differs from control P ≤ 0.05
differs from control P ≤ 0.01

TABLE 2

Effect of yeast inoculants on high moisture corn silage.

|  | Control | YE206 + LP286 | YE1241 + LP286 | YE1496 + LP286 |
|---|---|---|---|---|
| Total Yeast, $_{log\ CFU/g}$ | 6.63 | 6.91 | 6.75 | 6.68 |
| Inoc. Yeast, $_{log\ CFU/g}$ | 0.00 | 6.57# | 6.49# | 6.75# |
| ROT, $_{hrs}$ | 21.00 | 76.00# | 89.00# | 88.00# |
| Cumm-DD, $_{degree-hr}$ | 256.37 | 175.30 | 163.36* | 120.98# |

Values expressed as least squares means.
*differs from control P ≤ 0.05
differs from control P ≤ 0.01

EXAMPLE 3

Effects of Direct-Fed Yeast Strains on Rumen pH of Steers Fed Whole Plant Corn Silage Dekalb® brand corn hybrid DK61669VT3 (36.4% dry matter) was chopped, processed and ensiled without inoculation in 2011. Approximately 250 kg of forage was packed into each of several tote-boxes by hydraulic press. The net quantity of forage placed in each tote-box was recorded, the plastic liner pulled over the forage and tucked down into the sides of the tote-box, and the tote-box was sealed with a lid. After 71 days of ensiling, fistulated Angus steers, averaging approximately 500 kg, were fed 20 kg of wet corn silage per day via Calan® gates. The test diet consisted of 95% whole plant corn silage and 5% protein supplement on a dry matter basis. The animals had access to fresh water and salt/mineral blocks at all times. Each steer was fed 50% of their diet at 12 h intervals. The silage at each feeding was top-dressed with either 0 (control) or $1 \times 10^9$ yeast cells in a 5 gm maltodextrin carrier for a target feeding rate of $2 \times 10^9$ yeast cells per animal per day. The yeast strains were grown, stabilized and lyophilized as in known in the art. Dead yeast cells were generated by heating rehydrated yeast samples at 80 degree Celsius for 1 hour. Killed cells were again lyophilized prior to mixing with maltodextrin. Yeast viability and cell counts were assessed via flow cytometer BacLight™ Bacterial Viability Kit (Life Technologies, Grand Island, N.Y.). The trial was performed as a 4 by 4 Latin Square with 14 day periods. Rumen pH measurements were taken at 15 minute intervals with Kahne Limited (Auckland, New Zealand) rumen sensor boluses. Means were averaged over the final 7 days of each period. Hourly values were averages of 15 min means before and after each hour within the day. Boluses were removed, data downloaded and sensors recalibrated at the end of each period.

Table 3 shows the effects of direct-fed yeast supplementation on steer rumen pH. Steers were fed at 8:00 AM and 8:00 PM. At three to seven hours post-feeding, rumen pH was often higher when diet contained live yeast. Live yeast tended to retard the post-feeding drop in pH and speed pH recovery. Mean rumen pH was significantly higher in steers fed live yeast strains YE206 and YE1496 versus control steers or steers fed dead yeast strain YE1496. While not bound to one particular yeast mode of action, alteration in rumen pH in response to direct-fed *Saccharomyces cerevisiae* strains demonstrates rumen modulation capability.

TABLE 3

Mean rumen pH of steers fed whole plant corn silage with or without direct-fed yeast supplementation.

| Time of Day | Control | YE206 Live | YE1496 Live | YE1496 Dead |
|---|---|---|---|---|
| 12:00 PM | 6.187 | 6.433 | 6.424 | 6.392 |
| 1:00 AM | 6.276 | 6.514 | 6.533 | 6.442 |
| 2:00 AM | 6.445 | 6.614 | 6.610 | 6.459 |
| 3:00 AM | 6.651 | 6.718 | 6.718 | 6.537 |
| 4:00 AM | 6.684 | 6.732 | 6.733 | 6.647 |
| 5:00 AM | 6.727 | 6.741 | 6.820 | 6.727 |
| 6:00 AM | 6.823 | 6.770 | 6.872 | 6.799 |
| 7:00 AM | 6.879 | 6.872 | 6.924 | 6.858 |
| 8:00 AM | 6.743 | 6.796 | 6.724 | 6.688 |
| 9:00 AM | 6.501 | 6.533 | 6.439 | 6.429 |
| 10:00 AM | 6.287 | 6.423 | 6.340 | 6.242 |
| 11:00 AM | 6.146 | 6.355 | 6.277 | 6.150 |
| 12 NOON | 6.101 | 6.303 | 6.326 | 6.188 |
| 1:00 PM | 6.186 | 6.317 | 6.378 | 6.331 |
| 2:00 PM | 6.420 | 6.491 | 6.522 | 6.515 |
| 3:00 PM | 6.516 | 6.626 | 6.669 | 6.576 |
| 4:00 PM | 6.606 | 6.757 | 6.737 | 6.662 |
| 5:00 PM | 6.698 | 6.803 | 6.808 | 6.726 |
| 6:00 PM | 6.788 | 6.882 | 6.871 | 6.781 |
| 7:00 PM | 6.824 | 6.926 | 6.917 | 6.862 |
| 8:00 PM | 6.729 | 6.786 | 6.769 | 6.721 |
| 9:00 PM | 6.500 | 6.517 | 6.444 | 6.403 |
| 10:00 PM | 6.316 | 6.491 | 6.459 | 6.279 |
| 11:00 PM | 6.196 | 6.435 | 6.404 | 6.301 |
| Mean | $6.509^b$ | $6.618^a$ | $6.613^a$ | $6.530^b$ |

SE = 0.026
$^{ab}$Means not sharing a common superscript differ (P < 0.05)

Having illustrated and described the principles of the embodiments of the present invention, it should be apparent to persons skilled in the art that the embodiments of the invention can be modified in arrangement and detail without departing from such principles. We claim all modifications that are within the spirit and scope of the appended claims.

All publications and published patent documents cited in this specification are incorporated herein by reference to the same extent as if each individual publication or published patent document was specifically and individually indicated to be incorporated by reference.

REFERENCES

Balch, C. C, and W. V. Johnson. 1950. Factors affecting the utilization of food by dairy cows; factors influencing the rate of breakdown of cellulose (cotton thread) in the rumen of the cow. Brit. J Nutr. 4:389-94.

Callaway, E. S. and Martin, S. A. (1997). Effects of a *Saccharomyces cerevisiae* culture on ruminal bacteria that utilize lactate and digest cellulose. J. Dairy Sci. 80, 2035-2044.

Desnoyers, M., Giger-Reverdin, S., Bertin, G., Duvaux-Ponter, C. and Sauvant, D. (2009). Meta-analysis of the influence of *Saccharomyces cerevisiae* supplementation on ruminal parameters and milk production of ruminants. *J. Dairy Sci.* 92, 1620-1632.

Erasmus, L. J., Botha, P. M. and Kistner, A. (1992). Effect of yeast culture supplementation on production, rumen fermentation and duodenal microbial flow in dairy cows. *J. Dairy Sci.* 75, 3056-3065.

Guedes, C. M.; Goncalves, M. A. M.; Rodrigues, A.; Dias-da-Silva. A. (2008). Effects of a *Saccharomyces cerevisiae* yeast on ruminal fermentation fibre degradation of maize silages in cows. *Animal Feed Sci, and Tech.* 145, 27-40.

Martin, S. A. and Nisbet, D. J. (1992). Effects of direct fed microbials on rumen microbial fermentation. *J. Dairy Sci.* 75 1736-1744

Newbold, C. J., McIntosh, F. M., and Wallace, R. J. (1996). Mode of action of yeast *Saccharomyces cerevisiae* as a feed additive for ruminants. *Brit. J. Nutr.* 76 249-261.

Nocek, J. E., Holt, M. G. and Oppy, J. (2007). Effects of supplementation with yeast cultures and enzymatically hydrolyzed yeast on performance of early lactation dairy cattle. J. Dairy Sci. 94, 4046-4056.

Offer, N. W. (1990). Maximizing fiber digestion in the rumen: the role of yeast culture. In Biotechnology in the Feed Industry, ed. T. P. Lyons, Alltech Technical Publications, Nicholasville, Ky., pp. 79-96.

Querol, A., Barrio, E., and Ramon, D. (1992). A Comparative Study of Different Methods of Yeast Strain Characterization. *Systematic and Appl. Microbiol.* 15, 439-446.

Robinson, P. H. (1992) see World Wide Web (www): animalscience.ucdavis.edu/faculty/robinson/Articles/FullText/pdf/VVeb200901.pdf.

Swanson, K.; Grieshop, C.; Flickinger, E.; Bauer, L.; Healy, H.; Dawson, K.; Merchen, N. and Fahey, Jr, C. (2002).Supplemental Fructooligosaccharides and Mannanoligosaccharides Influence Immune Function, Ileal and Total Tract Nutrient Digestibilities, Microbial Populations and Concentrations of Protein Catabolites in the Large Bowel of Dogs. *The Journal of Nutrition,* 980-989.

Wallace, R. J. and Newbold, C. J. (1992). Probiotics for ruminants. In Probiotics: The Scientific Basis, ed. R. Fuller. Chapman and Hall, London, pp. 317-353.

What is claimed is:

1. A method for treating pre-ensiled plant material, the method comprising adding thereto: a yeast strain wherein the yeast strain is any one of: *Saccharomyces cerevisiae* strain YE206, deposited as Patent Deposit No. NRRL Y-50734; *S. cerevisiae* strain YE1241, deposited as Patent Deposit No. NRRL Y-50735; or *S. cerevisiae* strain YE1496, deposited as Patent Deposit No. NRRL Y-50736, one or more bacterial stains, and a suitable carrier.

2. The method of claim 1, wherein the bacterial strains comprise one or more of: *Lactobacillus plantarum, L. buchneri, L. alimentarius, L. crispatus, L. paralimentarius, L. brevis*, and *Enterococcus facium* and mixtures thereof.

3. The method of claim 2 wherein the bacterial strain comprises or more of: LP286, LN4017, LN4637, LP329, LP7109 or LN5689 and mixtures thereof.

4. The method of claim 1, wherein the composition contains from about $10^1$ to about $10^{10}$ viable organisms of said yeast strain per gram of a pre-ensiled plant material.

5. The method of claim 4, wherein the composition contains from about $10^3$ to about $10^6$ viable organisms of said yeast strain per gram of said pre-ensiled plant material.

6. The method of claim 1, wherein the pre-ensiled plant material is selected from the group consisting of grasses, maize, alfalfa, wheat, legumes, sorghum, sunflower, barley, grains, and mixtures thereof.

* * * * *